Patented Apr. 25, 1939

2,155,717

UNITED STATES PATENT OFFICE 2,155,717

PROCESS FOR PREPARING ADDITION PRODUCTS OF ALKALI METAL PERBORATES AND UREA

Fritz Kühnle, Gotha, Germany, assignor to E. I. du Pont de Nemours & Company, Wilmington, Del., a corporation of Delaware No Drawing. Application November 16, 1937, Serial No. 174,840. In Germany April 22, 1933

7 Claims. (Cl. 260—555)

This invention relates to the preparation of novel and valuable chemical addition products. More particularly, it is concerned with a process for the preparation of addition products of alkali metal perborates and urea, and to the novel chemical compounds produced thereby.

I have found that valuable addition products result when an alkali metal perborate is reacted with urea. The novel products are particularly useful for various purposes such as for bleaching, disinfecting and sterilization. Since they evolve oxygen on contact with various organic substances they are particularly useful for supplying oxygen to human or animal skins.

In preparing my new products, the alkali metal perborate is reacted with an equimolecular amount of urea. The reaction is carried out in aqueous solution and will proceed at room temperature. Of course, temperatures in excess of room temperature may be utilized, but ordinarily there is no advantage in using an elevated temperature.

The reaction which takes place proceeds in accordance with the following equation:

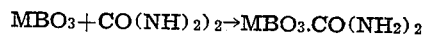

$$MBO_3 + CO(NH_2)_2 \rightarrow MBO_3 \cdot CO(NH_2)_2$$

In this equation M represents one of the alkali metals, i. e. lithium, potassium, sodium, rubidium or caesium. Since sodium perborate is readily obtained commercially, my preferred product is, of course, prepared by reacting sodium perborate and urea.

The resulting reaction product of the alkali metal perborate and urea may be secured in dry form from the solution by evaporation and crystallization. Temperatures of vaporization in excess of 50° C. should preferably be avoided during the evaporation and crystallization. This will necessitate carrying out the vaporization and crystallization preferably under reduced pressure. The addition products may also be secured in dry form by adding to the solution an agent in which the novel addition product is either insoluble or only slightly soluble. Such agents are alcohol and ether. The desired addition product thereupon precipitates out.

The novel products, which are isolated in the form of white crystals, are addition products of the particular perborate used with the urea. When sodium perborate is reacted with the urea, the resulting product is $NaBO_3 \cdot CO(NH_2)_2$, which is readily soluble in water, yielding a solutuion alkaline in reaction. It is difficultly soluble in alcohol and insoluble in ether, and may be precipitated by the addition of either of these liquids to its aqueous solution.

These products are not a simple mixture of the two starting compounds but are, in fact, new chemical products and may be demonstrated very simply. Under the microscope the addition compounds of sodium perborate and urea, for example, are revealed as colorless crystals of rose-like form. The characteristic long needle-like crystals of urea, which frequently occur in the form of leaf-like crystals, are completely absent.

The biuret reaction also shows that the new products are new chemical compounds and not mere mixtures of the particular perborate used and urea. When the new products are carefully melted there occurs only a distinct swelling of the mass without the evolution of ammonia. The biuret reaction does not take place when the resulting product is treated with an alkali containing a trace of copper sulfate.

The products obtained in accordance with the described process are exceedingly stable in the pure state at normal temperatures. Even when dissolved in water they evolve substantial quantities of oxygen only at temperatures in excess of 50° C. However, when placed in contact with organic substances, a slow continued evolution of oxygen takes place even at relatively low temperatures. The evolution of oxygen in contact with organic substances is not appreciable below about 35° C.

The novel products may be stabilized by the addition of stabilizing agents such as those normally used for the stabilization of hydrogen peroxide solutions. It is also possible to accelerate oxygen evolution, or to regulate the release of oxygen, by the addition to the products or to their aqueous solutions of agents which are known in the art as effective for the evolution of oxygen from per compounds.

The novel products need not be used in solution but may also be utilized in solid form. They may, for example, be injected as fine powders into body wounds and may be added to toothpastes and washing compositions. They are non-poisonous and have no irritating effect on body tissues.

As an example of my new products and the novel process by which they are prepared, the following example describing the preparation of the addition product of sodium perborate and urea may be regarded as illustrative:

Example

Three parts by weight of sodium perborate, $NaBO_3$, is dissolved in 100 parts by weight of water. To the solution is added 7 parts by weight of urea and thorough intermingling is secured by agitation. The reaction proceeds at room temperature. The resulting clear solution is then evaporated under vacuum at a temperature not exceeding 50° C. The resulting concentrated solution is then cooled to room temperature whereupon the addition product precipitates in the form of fine white crystals. These are separated from the mother liquor by filtration and carefully dried at a temperature of aobut 8–10° C.

It is understood that the foregoing details of my invention are to be regarded as illustrative and not as restrictive. Various changes may be made in the process as disclosed without departing from the spirit of the invention. I therefore do not wish to limit myself to precise methods of procedure as the scope of my invention is to be determined in accordance with the appended claims.

I claim:

1. A process for preparing addition products of alkali metal perborates and urea which comprises reacting an alkali metal perobrate with urea.

2. A process for preparing addition products of alkali metal perborates and urea which comprises reacting, in aqueous solution, an alkali metal perborate and urea.

3. A process for preparing addition products of sodium perborate and urea which comprises reacting sodium perborate and urea.

4. A process for preparing addition products of alkali metal perborate and urea which comprises reacting an alkali metal perborate with an equimolecular amount of urea.

5. A process for reacting addition products of alkali metal perborate and urea which compirses reacting sodium perborate with an equimolecular amount of urea.

6. The addition compound having the following formula: $MBO_3.CO(NH_2)_2$ where M represents an alkali metal.

7. As a new chemical compound $NaBO_3.CO(NH_2)_2$.

FRITZ KÜHNLE.